May 21, 1968 S. E. MILLER 3,384,839

PULSE CODE MODULATOR INCLUDING A MULTIFREQUENCY OSCILLATOR

Filed Sept. 24, 1965 2 Sheets-Sheet 1

INVENTOR
S. E. MILLER
BY
Sylvan Sherman
ATTORNEY 3,384,839
PULSE CODE MODULATOR INCLUDING A MULTIFREQUENCY OSCILLATOR Stewart E. Miller, Middletown, N.J., assignor to Bell Telephone Laboratories, Incorporated, New York, N.Y., a corporation of New York Filed Sept. 24, 1965, Ser. No. 489,958
4 Claims. (Cl. 332—14)

This invention relates to pulse code modulation systems (PCM) in which frequency is the quantized parameter.

In the typical pulse code modulation system, the signal is sampled periodically to ascertain its instantaneous amplitude. The measured instantaneous amplitude is then converted to a series of pulses which are transmitted in lieu of the actual signal. In such a system, signal amplitude is the quantized parameter, and the encoded, transmitted signal contains the amplitude information.

In amplitude quantized systems, noise, and other instabilities typical of such systems, cause the level settings in the quantizer to shift, thereby increasing the error rate of the system. This is particularly so in systems employing a large number of levels. For example, in a seven digit system there are $2^7=128$ levels to be set so that a drift of less than one percent of full signal amplitude will cause an error.

In accordance with the present invention, instantaneous amplitude variations of the signal are converted to frequency variations, and the instantaneous frequency of the signal sampled. The measured frequency is then used as the "seeding" signal for a multistate oscillator adapted to oscillate at one of a plurality of discrete frequencies set by the seeding signal. By going into the frequency domain, the quantizing levels are set by the frequencies of the states of the multistate oscillator. Since these are largely determined by passive circuit elements, they can easily be made very stable.

The signal generated by the multistate oscillator can be transmitted directly in a system using similar multistate oscillators as regenerative repeaters, or the signal produced by the encoding multistate oscillator can be converted into either an AM–PCM signal, or an FM–PCM signal or, more generally, into any other type of encoded signal for use on existing, high-frequency transmission systems. In one illustrative embodiment of the invention to be described in greater detail hereinbelow, a four level, frequency-quantized signal is translated into a binary FM–PCM output signal.

These and other objects and advantages, the nature of the present invention, and its various features, will appear more fully upon consideration of the various illustrative embodiments now to be described in detail in connection with the accompanying drawings, in which.

Figure 1:
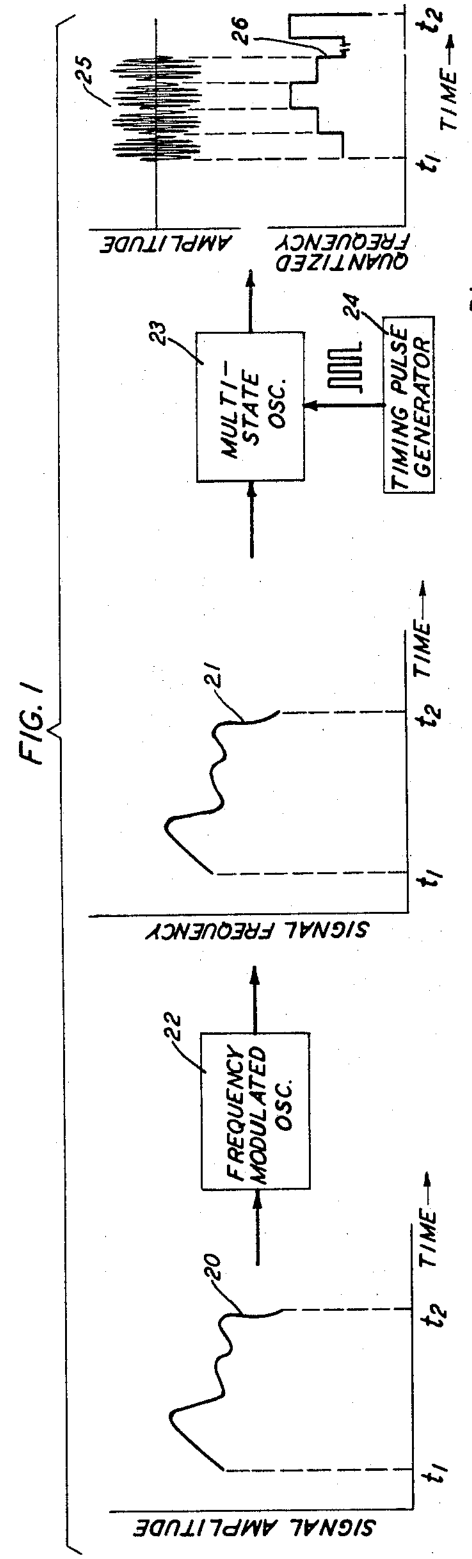
FIG. 1 is a block diagram of frequency quantized pulse code modulator in accordance with the invention.

Referring to the drawings, FIG. 1 illustrates symbolically the elements of a frequency-quantized pulse code modulator in accordance with the invention. As depicted therein, the intelligence-bearing signal is represented by curve 20 which shows the instantaneous amplitude variations of the signal as a function of time over the interval $t_1$ to $t_2$.This signal is converted into a frequency varying signal, depicted by curve 21, by means of a frequency modulated oscillator 22.

Curve 21 shows the instantaneous frequency variations of the signal, as a function of time, over the same interval $t_1$ to $t_2$. The conversion of an amplitude-varying signal into a frequency varying signal is readily accomplished by any of the means well known in the art. See, for example, chapter 17 of "Electronic and Radio Engineering," by F. E. Terman, published by McGraw-Hill Book Company, Incorporated, 1955.

The frequency varying signal represented by curve 21 is applied to a multistate oscillator 23, wherein it functions as the "seeding" signal for oscillator 23. Such an oscillator has the general property that it oscillates, at any given moment, in one and only one of a multitude of different possible modes. Devices of this type, having two operating states, have been described by B. van der Pol in an article entitled, "On Oscillation Hysteresis in a Triode Generator With Two Degrees of Freedom," published in Philosophical Magazine, volume 43, 1922, pages 700–719. (Also see "The Non-Linear Theory of Electric Oscillations," by B. van der Pol, Proceedings of the Institue of Radio Engineers, volume 22, September 1934, pages 1051–1086.)

As the possible modes can be a set of fixed, discrete output frequencies, it is proposed that a multistate oscillator be advantageously used as the frequency quantizer in the embodiment of the invention illustrated in FIG. 1.

Figures 2, 3:
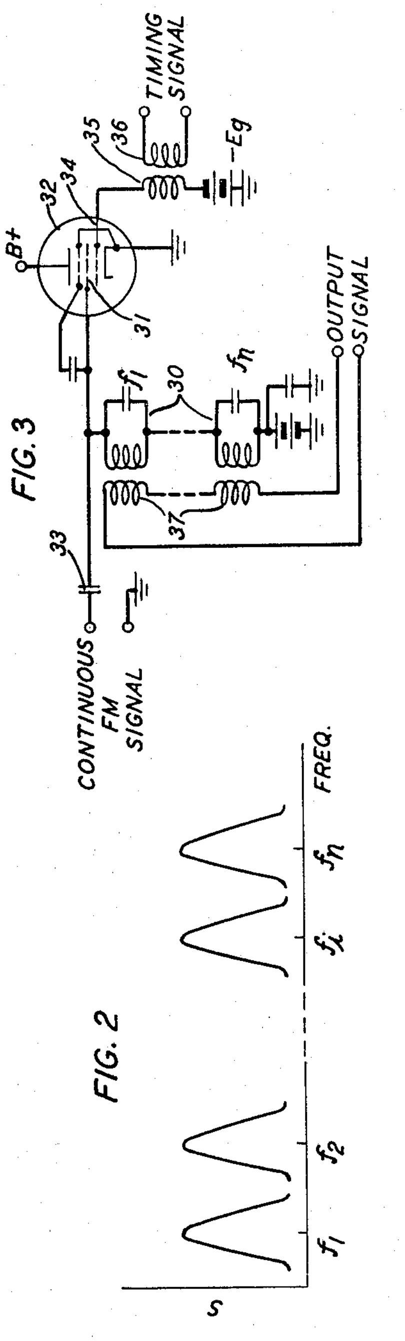
FIG. 2 shows the selectivity curve of a multistate oscillator.
FIG. 3 is the circuit diagram of an illustrative embodiment of a multistate oscillator.

Typically, a multimode oscillator has a selectivity curve of the type shown in FIG. 2. When the circuit is turned "on" from an "off" state, oscillations build up from noise at one, or at all, of the possible frequencies $f_1$, $f_2$, $f_i$, and $f_n$. In general, this build up is a random process. In accordance with the invention, however, it is required that the steady-state output be at one, and only one, of these possible frequencies. Furthermore, it is required that the final mode of oscillation be capable of being selected by the injection, at turn-on, of a small seeding signal near, or at, the appropriate frequency. Thus, through stimulated oscillation or emission, oscillations build up in the desired mode and, simultaneously, oscillations at all the other modes (frequencies) are suppressed.

The necessary conditions for suppressing oscillations in undesired modes are given by W. A. Edson in his paper "Frequency Memory in Multi-Mode Oscillators," published in the Institute of Radio Engineers Transactions on Circuit Theory, volume CT–2, pages 58–66, March 1955. In brief this property (which Edson calls discrimination) will usually result if all the modes receive energy from the same source and that source is limited in its available output. It is, therefore, an inherent property of many physically realizable circuits which use a driving source common to all modes. In circuits utilizing a negative-resistance device, it results from the nonlinearity of the voltage-current characteristic and, as Edson notes, can be optimized by properly adjusting the characteristic. In quantum systems particular care must be taken that the single driving source requirement is not overlooked. More specifically, this means that the same excited atom is responsible for emission to all modes. Any modes utilizing different sets of excited atoms may oscillate independently.

When used as a frequency quantizer, oscillator 23 is adapted to oscillate at a plurality of discrete frequencies distributed over the band of frequencies corresponding either to the maximum frequency excursion capability of frequency modulated oscillator 22, or to some preselected, limited frequency excursion within that capability.

Simultaneously with the application of the frequency modulated signal, a timing signal, derived from a timing pulse generator 24, is applied to oscillator 23. The timing signal determines the time interval over which the signal is sampled, and the time duration over which oscillator 23 remains on.

The output from oscillator 23 comprises a sequence of high-frequency pulses 25 whose time duration is determined by the timing signal, and whose frequency is determined by the instantaneous frequency of the input signal during the "on" period of the multistate oscillator 23. The latter is stimulated to oscillate at one of the preselected frequencies that is closest to the instantaneous frequency of the input seeding signal. Curve 26 shows the frequencies at which oscillator 23 is induced to oscillate over the time interval $t_1$ to $t_2$ in response to the signal depicted by curve 21.

FIG. 3 is an illustrative embodiment of a multistate oscillator of a type that can be used in the present invention. This particular circuit utilizes a pentode oscillator configuration similar to that shown by W. A. Edson in his above-cited article "Frequency Memory in Multi-Mode Oscillators." In this circuit a plurality of resonant circuits 30 are connected to the screen grid 31 of vacuum tube 32. The resonant circuits are designed to have a multiplicity of resonances equal in number to the number of frequency levels to be quantized.

The continuous FM input signal, or seeding signal, is coupled to the screen grid 31 through a blocking capacitor 33, and provides the stimulation which induces oscillations at one of the plurality of frequency modes.

In practice, the oscillator is biased "off" by means of a negative voltage $-E_g$ applied to the control grid 34 through a transformer secondary winding 35. The primary winding 36 is coupled to the timing pulse generator which provides the timing signal for biasing the oscillator "on" at preset intervals. The timing signal determines the pulse repetition rate and the pulse duration of the output signal which is derived from a set of secondary windings 37 coupled to tuned circuits 30.

At higher frequencies, the multistate oscillator advantageously employs a distributed tuned circuit comprising a long length of short-circuited coaxial line or waveguide. As is known, a long length of shorted transmission line is multimode, and is characterized by a plurality of resonances.

The output signal derived from the multimode oscillator, comprising a sequence of high frequency pulses, can be transmitted directly, or it can be translated into another form of signal prior to transmission. An example of an encoder circuit for translating a four level frequency-quantized signal into a binary FM–PCM signal is given in block diagram in FIG. 4. In this figure, the input signal is represented by a stepped frequency curve which represents four signal pulses at the four frequencies $f_1$, $f_2$, $f_3$ and $f_4$. The input signal is applied to a two-mode oscillator 40, adapted to oscillate at freqnency $\frac{1}{2}(f_1+f_2)$ or frequency $\frac{1}{2}(f_3+f_4)$, and, through switch 41, to either of two other two-mode oscillators 42 or 43. Oscillator 42 is adapted to oscillate at either frequency $f_1$ or $f_2$, whereas oscillator 43 is adapted to oscillate at either frequency $f_3$ or $f_4$.

Figure 4:
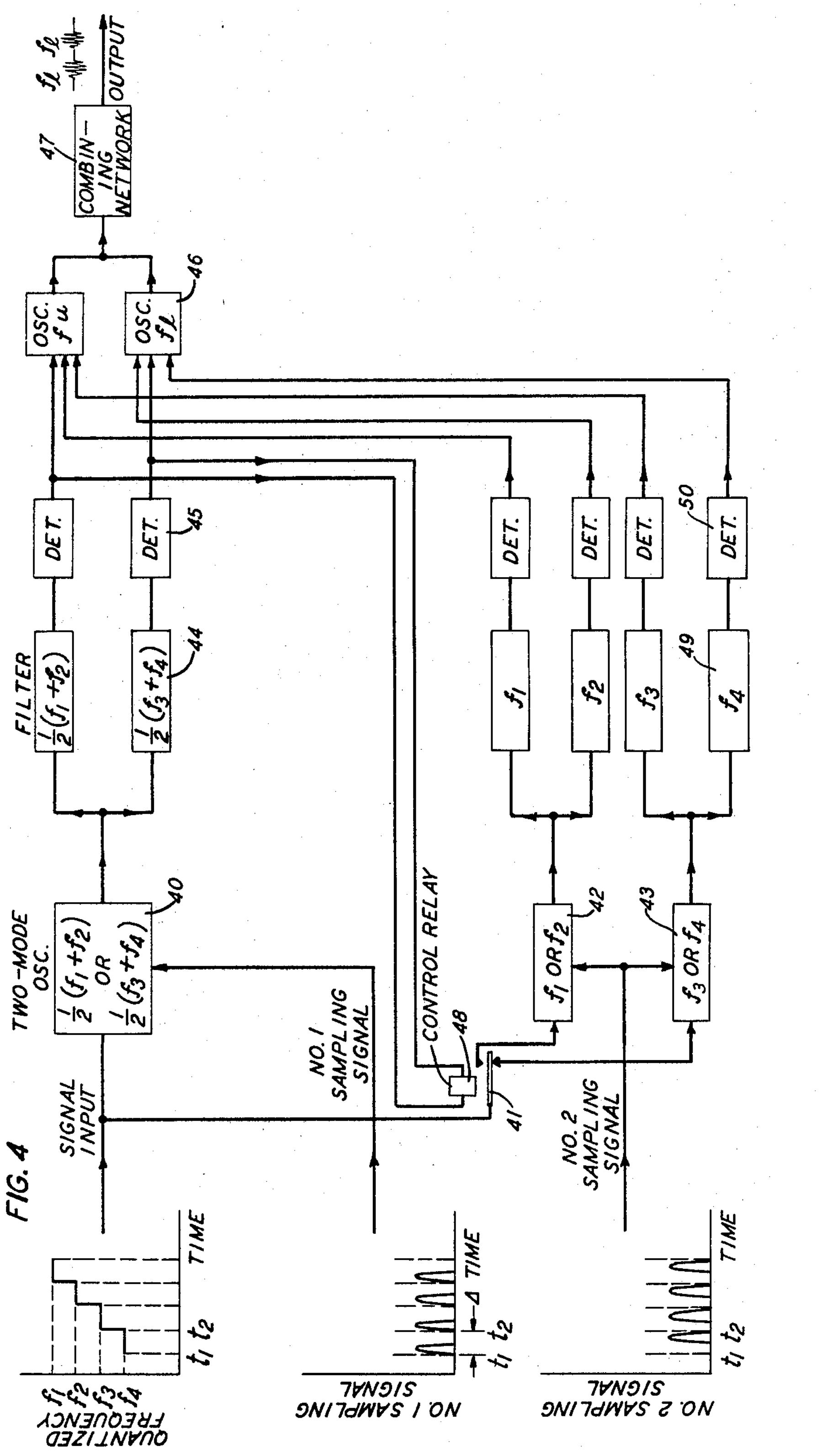
FIG. 4 is a block diagram of a translator for translating a four level, frequency-quantized signal into an FM–PCM signal.

The two-mode oscillators are pulsed "on" and "off" during the duration of each signal pulse by means of two sampling signals. The #1 sampling signal activates oscillator 40 which, as noted above, is induced to oscillate at frequency $\frac{1}{2}(f_1+f_2)$ or at frequency $\frac{1}{2}(f_3+f_4)$, depending upon the frequency of the input signal frequency. In FIG. 4, the frequency of the first input signal pulse is $f_4$, thereby causing oscillator 40 to oscillate at the nearest frequency $\frac{1}{2}(f_3+f_4)$. The resulting signal is passed by filter 44 and detected in detector 45. The output from detector 45 is used to pulse oscillator 46 "on," thereby producing an output pulse at frequency $f_1$. This output pulse is coupled out of the translator circuit through combining network 47.

An output pulse at frequency $f_1$ indicates that the frequency of the input signal is either $f_3$ or $f_4$. In order to determine which of these two frequencies is the correct one, a second sampling of the first pulse of the input signal is made. This is accomplished in oscillators 42 and 43, which are now activated by the #2 sampling signal. In addition, the output from detector 45 operates upon switch 41 in a manner to connect the input signal to oscillator 43. Switching is accomplished by means of a control relay 48. The simultaneous application of the #2 sampling signal and the input signal to oscillator 43 causes the latter to oscillate at frequency $f_4$. The output from oscillator 43 is coupled to detector 50 through filter 49, and the detected signal applied to oscillator 46 wherein a second pulse at frequency $f_1$ is generated.

The output signal from the translator thus comprises two pulses at frequency $f_1$. This is the encoded equivalent of an input signal of frequency $f_4$. By a similar analysis, it can be shown that the output for an input signal of frequency $f_3$ comprises a first pulse of frequency $f_1$ followed by a second pulse of frequency $f_u$. For input frequency $f_2$, the output is a pulse of $f_u$ followed by a pulse of $f_1$, whereas for an input signal of frequency $f_1$, two pulses of frequency $f_u$ are produced.

It is to be understood that the multimode oscillator shown in FIG. 2 and the translator shown in FIG. 4 are merely intended to be illustrative of the arrangements that can be used to practice the present invention. Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A pulse code modulation system comprising:
   - a frequency modulated oscillator;
   - means including an amplitude-varying signal for frequency modulating said oscillator over a range of frequencies in response to said signal;
   - a multistate oscillator adapted to oscillate at any one of a multiplicity of different discrete frequencies within said range of frequencies in response to excitation by wave energy near said one frequency;
   - means for pulsing said multistate oscillator on and off at prescribed intervals;
   - means for applying wave energy samples from said frequency modulated oscillator to the input of said multistate oscillator;
   - and means for extracting wave energy at said discrete frequencies during the on periods of said multistate oscillator.

2. The system according to claim 1 wherein said extracted wave energy is encoded in binary pulse code modulation.

3. In combination;
   - a frequency modulated oscillator;
   - an amplitude-varying signal source applied to said oscillator;
   - a multifrequency oscillator capable of oscillating at any one of a plurality of different frequencies within the range of output frequencies of said frequency modulated oscillator;
   - a timing generator coupled to said multifrequency oscillator;
   - means for coupling the output from said frequency modulator oscillator to said multifrequency oscillator;

and means for extracting wave energy from said multifrequency oscillator.

4. A frequency-quantized pulse code modulator comprising;

means for converting an amplitude-varying signal to a frequency varying signal;

a multifrequency oscillator adapted to oscillate at a plurality of discrete frequencies within the range of frequencies of said frequency varying signal;

and a timing signal for pulsing on said multifrequency oscillator at specified intervals;

said oscillator further adapted to sample said frequency varying signal at said specified intervals and to produce during each of said intervals an output signal at one of said discrete frequencies nearest to the instantaneous frequency of said frequency varying signal.

No references cited.

ALFRED L. BRODY, *Primary Examiner.*